United States Patent [19]

Davis

[11] 4,446,650

[45] May 8, 1984

[54] HERBICIDE APPLICATOR

[76] Inventor: Douglas D. Davis, 1721 E. 7th St., Hopkinsville, Ky. 42240

[21] Appl. No.: 411,520

[22] Filed: Aug. 25, 1982

[51] Int. Cl.³ .............................................. A01G 13/00
[52] U.S. Cl. ........................................................ 47/1.5
[58] Field of Search ................ 47/1.5, 1.7, 48.5; 401/203, 205, 196, 197; 119/159; 239/145

[56] References Cited

U.S. PATENT DOCUMENTS

| | | | |
|---|---|---|---|
| 2,935,818 | 5/1960 | Crane | 47/1.5 |
| 3,257,753 | 6/1966 | Zennie | 41/1.5 |
| 3,320,694 | 5/1967 | Biron | 47/1.5 |
| 3,651,600 | 3/1972 | Ewing | 47/1.5 |
| 3,738,060 | 6/1973 | Jullien-Davin | 47/47 |
| 3,925,927 | 12/1975 | Linton | 47/1.5 |
| 3,946,762 | 3/1976 | Green | 47/40.5 |
| 4,019,278 | 4/1977 | McKirdy | 47/1.5 |
| 4,168,798 | 9/1979 | Moore | 239/121 |
| 4,187,638 | 2/1980 | Hardy | 47/1.5 |
| 4,208,835 | 6/1980 | Roll | 47/1.5 |
| 4,219,964 | 9/1980 | Dale | 47/1.5 |
| 4,223,478 | 9/1980 | McHugh | 47/1.5 |
| 4,285,160 | 8/1981 | Barton | 47/1.5 |
| 4,302,904 | 12/1981 | Mead | 47/1.5 |
| 4,328,640 | 5/1982 | Revelle | 47/1.5 |

*Primary Examiner*—Robert A. Hafer
*Assistant Examiner*—Bradley M. Lewis

[57] ABSTRACT

A device for applying nonselective herbicides to weeds and other target plants in a selective fashion which is inexpensive, not mechanically complex, can be used on sloping fields, and has good speed of application. The device uses fabric covered perforated tubing to transmit herbicide to the target plants by wiping them as the device travels through the field.

10 Claims, 4 Drawing Figures

HERBICIDE APPLICATOR

FIELD OF THE INVENTION

This invention relates to an agricultural chemical applicator, specifically one for applying nonselective herbicides to tall weeds.

BACKGROUND OF THE INVENTION

It is well known that primarily two types of herbicides are in use. The first type is selective and kills only "target" plants (weeds). This type is applied generally over the treatment area, such as by spraying. The second type is nonselective and kills almost all plants it contacts. Usually, only a small quantity of the second type, applied to the leaves or foliage, is needed to effectuate the "kill".

It is obvious that widespread spraying of a selective herbicide can be expensive (and inefficient), for a substantial portion of the herbicide fails to reach the "target". The herbicide that is applied to the desired crop and bare ground is wasted. Another problem with selective herbicides is that they are not always effective, as there are not selective herbicides for all crops and all weeds.

Nonselective herbicides are much more efficient and thus less expensive to use. Such herbicides are not applied by spraying, for contact with the desired crop would kill it. This is why considerable effort has gone into finding a means for selectively applying a nonselective herbicide. There is no waste when the herbicide is applied only to the plants intended to be killed.

One general characteristic of weed growth that has made the selective application of a nonselective herbicide practical is the propensity of weeds to quickly grow taller than the desired crops. Thus, early in the growing season when the crops are short and the weeds much taller, a direct application of herbicide to the foliage of the weeds by means of wiping can be accomplished with good results.

PRIOR ART

The devices that have been developed for the application of nonselective herbicides to weeds generally fall in one of three categories: fabric-covered rollers, controlled sprayers, and herbicide-applying bars. An example of the first type is found in the D. A. McHugh U.S. Pat. No. 4,223,478 issued Sept. 23, 1980. An example of the second type is found in the H. C. Mead U.S. Pat. No. 4,302,904 issued Dec. 1, 1981. The problem with the first two types is that they tend to be mechanically complex and expensive.

The third type is usually much simpler and less expensive. Examples of herbicide-applying bars are found in the J. A. McKirdy U.S. Pat. No. 4,019,278 issued in Apr. 26, 1977, in the J. H. Hardy U.S. Pat. No. 4,187,638 issued Feb. 12, 1980, and in the J. E. Dale U.S. Pat. No. 4,219,964 issued Sept. 2, 1980. Both devices described in the Hardy patent and in the Dale patent are commonly called "rope wick" applicators. A more complex "rope wick" applicator is described in the J. J. Barton U.S. Pat. No. 4,285,160 issued Aug. 25, 1981. A "rope wick" applicator works by capillary action; the exposed rope is moistened with herbicide from a reservoir, and as the rope contacts the plant, wiping herbicide on it, the herbicide in the rope is replenished by capillary action from the reservoir. This type applicator works fairly well, but the actual application of herbicide in the field proceeds slowly due to the slowness of the capillary action in the rope. The simple Hardy and Dale designs also do not work effectively on sloping surfaces, a problem addressed in the Barton patent.

SUMMARY OF THE INVENTION

I have invented a new and useful herbicide applicator which can be used with nonselective herbicides and a selective herbicide, Poast. Its simplicity in design makes it inexpensive, yet it provides excellent weed control, can be effectively operated on sloping surfaces, and applies herbicide to weeds in the field several times faster than do "rope wick" applicators.

My invention employs perforated and/or porous tubing mounted on a boom, which in turn is typically mounted on a tractor transverse to the direction of travel. The tubing is connected by hoses to a low-pressure pump and a reservoir of herbicide.

In the first embodiment the tubing is spirally wound around the boom and is perforated throughout its length with a series of small holes such that the herbicide, under pressure, quickly and efficiently fills the full length of tubing and sprays out all the holes. The entire boom and tubing assembly is covered by an absorbent fabric which catches and absorbs the sprayed herbicide.

In the second embodiment, a length of perforated and/or porous tubing is used. It is covered by an absorbent fabric which catches and absorbs the herbicide emitted from the pressurized tube. The fabric covering is clamped between two pieces of rigid angles which hold the assembly in a horizontal position.

As the tractor travels through the field, the height of the tubing assembly is adjusted so that the herbicide-soaked fabric contacts the weeds, but not the desired crops, thus wiping the weeds with nonselective herbicide. With this invention, as opposed to "rope wick" applicators, the speed of the tractor will depend on the rate at which the herbicide is sprayed on the fabric by the action of the pump and considerably less on the thickness of the weeds. This rate of speed is typically 5 to 8 miles per hour, which is better than the typical 2 to 5 mile per hour speed for a "rope wick" applicator. Because the herbicide is under pressure and is spraying on the fabric throughout the length of the boom, my invention works well on sloping fields.

DESCRIPTION OF THE PREFERRED EMBODIMENTS

Figure 1:
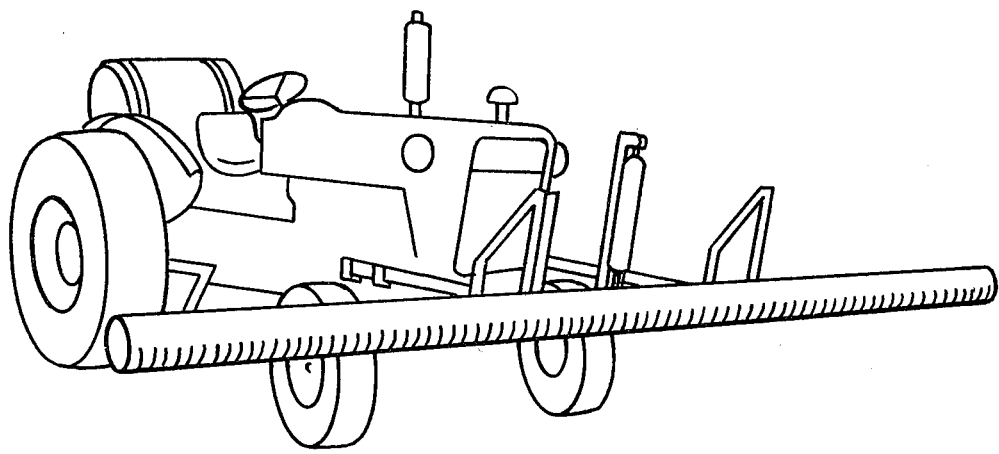
FIG. 1 is a perspective view of the first embodiment of the invention mounted on the front of a tractor.
Figure 2:
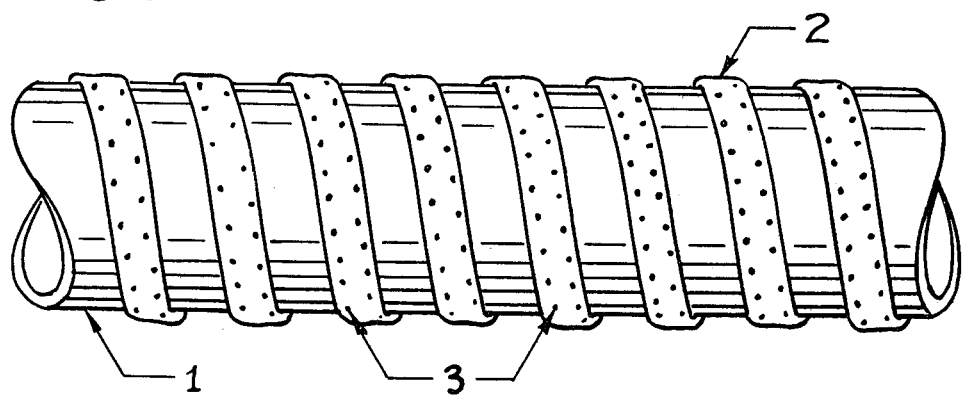
FIG. 2 is a front elevational view of an uncovered boom section illustrating the perforated spirally wound tubing of the first embodiment.
Figure 3:
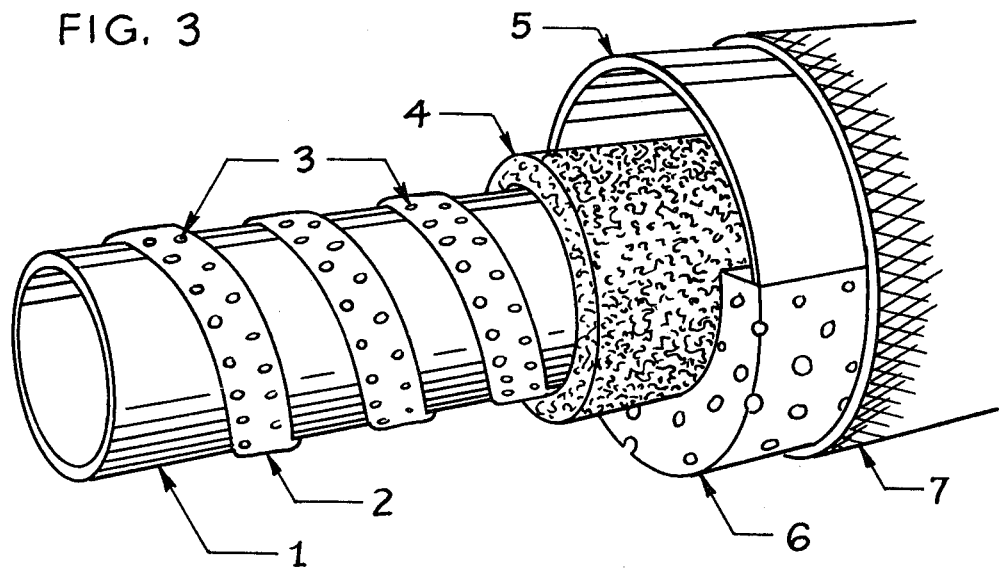
FIG. 3 is a perspective cutaway view of the first embodiment.

What follows is a detailed description of the two preferred embodiments of my invention. While either works well in heavy or light weed growth, the first embodiment provides for a heavier flow of herbicide to the wiping layer, so it allows for faster travel through fields of heavy weed growth. For this reason the first embodiment could be characterized as being for "heavy duty" use. The second embodiment is lighter in construction and will not give quite the coverage in heavy weed growth as the first (at the same tractor speed), so it could be characterized as being for "regular duty" use.

A. First Embodiment

Referring now to the drawings wherein like numerals designate like parts, the boom 1 is constructed from a rigid hollow tube which is capped at both ends. Polyvinyl chloride (PVC) pipe is preferred, because it is both lightweight and strong. The boom 1 can be of any length desired, with the only limitations being the strength of the material used and maneuverability in the field. Ribbon-type tubing 2 with small perforations 3 throughout its length on the side facing away from the boom is wrapped around the boom 1 in a spiral. The spiral tubing 2 is connected by hoses to a low-pressure pump and reservoir of herbicide. The perforations 3 in the tubing are of such a size and configuration that, when herbicide is pumped into the tubing 2, it is caused to spray radially from the boom 1 throughout the length of the tubing 2. The boom 1 and tubing 2 are covered with an absorbent material to catch the spray and to serve as a means for wiping the weeds with herbicide. The entire assembly is horizontally mounted on a means for conveying the assembly, the herbicide reservoir, and the pump through the field, usually a tractor. The assembly should be mounted transverse to the direction of travel and should be mounted so as to be adjustable in height while being driven through the field. The assembly can be rear-mounted, but it is preferable to mount the assembly on the front of the tractor to more easily monitor coverage and prevent dripping the herbicide.

In its preferred embodiment, the absorbant material used to catch the spray from the tubing 2 is comprised of several layers. Terrycloth fabric 4 is the preferred fabric for the inside layer closest to the tubing 2. This type fabric is very absorbant and has good capillary action which promotes uniform distribution of the herbicide over the length of the boom 1. The next layer consists of two sections. The top section 5 covers the top one half of the terrycloth layer 4 and should be impervious to liquid; it can be made from PVC pipe of a slightly larger diameter than the boom 1. The bottom section 6 covers the lower one half of the terrycloth layer 4 and should have the capacity to absorb a relatively large quantity of herbicide. It serves as a herbicide reservoir to absorb excess spray from the tubing 2 when weed density is light and to provide extra herbicide when weed density is heavy. The bottom section 6 minimizes the need for constant adjustment of the rate of herbicide flow to the tubing 2 to insure adequate coverage and to prevent excess dripping, and eliminates the need for a complex moisture sensing device. The bottom section 6 can be of any material with sufficient absorbence capacity, preferably cellulose sponge. The outer layer 7 covers the entire assembly and should be constructed of a material that will readily transmit herbicide from the sponge layer 6 to the weeds and is sufficiently tough to withstand abrasion. The use of polyester cloth is preferred for the outer layer 7. The outer layer 7 should also be easily removeable to facilitate replacement or cleaning.

The connection of the tubing 2 with the reservoir can be at either end of the boom 1 or at both ends to achieve a recirculating system. An alternative method would be to use two spirally wound tubes 2 that began at the middle of the boom and are wound toward the ends. The use of this method would allow connections at the middle of the boom. It would also allow the boom to be made in two sections, so it could be swung up on hinges and out of the way to facilitate travel to and from the field. The flow of herbicide to the tubing 2, and thus the pressure in the tubing 2, can be controlled by controlling the operation of the pump, the use of valves, or a combination.

B. Second Embodiment

Figure 4:
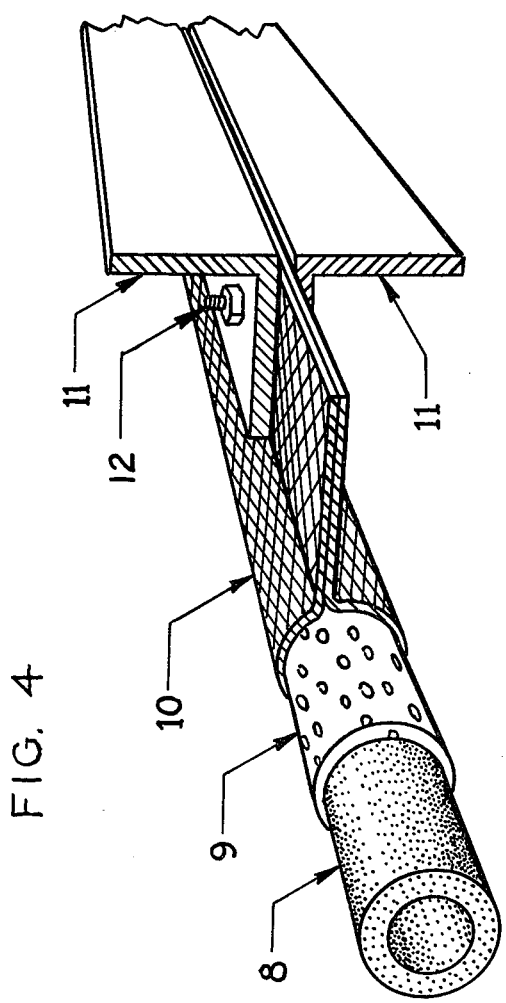
FIG. 4 is a perspective cutaway view of the second embodiment.

Referring now to FIG. 4, the second preferred embodiment comprises a length of tubing 8 covered by an absorbant layer 9, which is covered by a wiping layer 10. The wiping layer 10, in turn, is clamped between two equal lengths of rigid angles 11 by means of bolts 12. The entire assembly is mounted horizontally on a means for conveying the assembly, a herbicide reservoir, and a low-pressure pump through the field, usually a tractor. The assembly should be mounted transverse to the direction of travel and be mounted so as to be adjustable in height while being driven through the field. The assembly can be rear-mounted, but it is preferable to mount the assembly on the front of the tractor to more easily monitor coverage and prevent dripping of herbicide.

The tubing 8 can be porous, perforated by a series of holes running the length of the tubing 8, or both porous and perforated. The porosity of the tubing should be such that the tubing 8 does not "leak" unless the herbicide is under pressure. Any perforations should be of such a size and configuration that herbicide is emitted only when under pressure. The tubing 8 shown in FIG. 4 represents porous, nonperforated tubing. If a perforated tube is used, there should be an adequate number of perforations to wet the absorbant layer 9 over the entire length of the assembly; for instance, use three rows of 150 perforations per row over a sixteen foot length of tubing. The connection of the tubing 8 with the reservoir can be at either end of the tubing 8 or at both ends to achieve a recirculating system. The flow of herbicide to the tubing 8, and thus the pressure in the tubing 8, can be controlled by controlling the operation of the pump, the use of valves, or a combination.

The absorbant layer 9 catches the herbicide that "leaks" or sprays from the tubing 8 and serves as a herbicide reservoir. Perferably, the absorbant layer 9 is constructed of cellulose sponge. It should cover the entire length of the tubing 8.

The wiping layer 10 covers the absorbant layer 9 and serves as a means for transmitting the herbicide from the absorbant layer 9 to the weeds. It should be sufficiently tough to withstand abrasion, and the use of polyester cloth is preferred. By using angles 11 to clamp the wiping layer 10 in position around the tubing 8 and absorbant layer 9, the wiping layer is easily removeable to facilitate cleaning or replacement.

The angles 11 should be rigid and strong enough to support the weight of the assembly and to withstand any strain put on the assembly in the process of wiping herbicide on the target plants. The angles 11 should also be long enough to support the entire length of the assembly in a horizontal position. Two 1.5 inch iron angles work well for this purpose, but they need to be protected from rusting through contact with the herbicide-moistened wiping layer 10 by means of plastic coating or barrier.

I claim:

1. An apparatus for applying herbicides to plants comprising (a) perforated tubing spirally wound around a rigid tube,
(b) means for introducing herbicide into the perforated tubing under pressure, and
(c) an absorbant cover over the entire tubing and rigid tube assembly.

2. An apparatus according to claim 1 wherein the rigid tube is polyvinyl chloride pipe.

3. An apparatus according to claim 1 wherein the tubing is ribbon-type tubing perforated throughout its length on the side facing away from the rigid tube.

4. An apparatus according to claim 3 wherein the perforations in the tubing are of such a size and configuration that herbicide is emitted through them only when the herbicide is under pressure.

5. An apparatus according to claim 1 wherein the absorbant cover comprises an innermost layer of terry-cloth fabric, an outermost layer of polyester fabric, and the apparatus further comprising, a second covering in two sections covering the absorbent cover and having a top semi-circular half of material relatively impervious to liquid, and a bottom semi-circular half of material with the capacity to absorb a quantity of herbicide.

6. An apparatus according to claim 5 wherein the covering comprises a top half is polyvinyl chloride pipe and the bottom half is cellulose sponge.

7. An apparatus for applying herbicide to plants comprising
(a) tubing perforated over its entire length or which is porous,
(b) means for introducing herbicide into the tubing under pressure,
(c) an absorbant cover over the length of tubing, and
(d) means for holding the tubing in a horizontal position.

8. An apparatus according to claim 7 wherein the perforations in the tubing or the tubing's porousity are such that herbicide is emitted to the absorbant cover only when the herbicide is under pressure.

9. An apparatus according to claim 7 wherein the absorbant cover comprises an inner layer of cellulose sponge and an outer layer of polyester fabric.

10. An apparatus according to claim 7 wherein the holding means comprises two rigid angles the same length as the tubing which are joined together to form a clamp.

* * * * *